(12) United States Patent
Hao et al.

(10) Patent No.: US 12,477,215 B2
(45) Date of Patent: Nov. 18, 2025

(54) PHOTOGRAPHING GUIDING METHOD AND APPARATUS, AND ELECTRONIC DEVICE AND STORAGE MEDIUM

(71) Applicant: Beijing Zitiao Network Technology Co., Ltd., Beijing (CN)

(72) Inventors: Yipeng Hao, Beijing (CN); Yi Chen, Beijing (CN); Yepeng Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 76 days.

(21) Appl. No.: 18/571,072

(22) PCT Filed: Aug. 25, 2022

(86) PCT No.: PCT/CN2022/114721
§ 371 (c)(1),
(2) Date: Dec. 15, 2023

(87) PCT Pub. No.: WO2023/035960
PCT Pub. Date: Mar. 16, 2023

(65) Prior Publication Data
US 2024/0284038 A1    Aug. 22, 2024

(30) Foreign Application Priority Data
Sep. 7, 2021 (CN) .......................... 202111045908.0

(51) Int. Cl.
*G06T 7/60* (2017.01)
*G06T 7/73* (2017.01)
(Continued)

(52) U.S. Cl.
CPC ............... *H04N 23/64* (2023.01); *G06T 7/60* (2013.01); *G06T 7/75* (2017.01); *G06T 17/05* (2013.01); *G06T 19/006* (2013.01)

(58) Field of Classification Search
None
See application file for complete search history.

(56) References Cited

U.S. PATENT DOCUMENTS

2019/0041972 A1    2/2019  Bae
2020/0184736 A1*   6/2020  Mihara ................... G06T 19/00
(Continued)

FOREIGN PATENT DOCUMENTS

CN    108876840 A    11/2018
CN    109636916 A     4/2019
(Continued)

*Primary Examiner* — Tapas Mazumder
(74) *Attorney, Agent, or Firm* — Astute IP Law Group

(57) ABSTRACT

A photographing guiding method and apparatus, and electronic device and storage medium are provided. The photographing guiding method includes: determining a physical position of an object to be modeled according to a physical position of a capturing apparatus; determining a virtual polyhedron which matches the object to be modeled according to the physical position of the object to be modeled; based on an augmented reality AR technology, displaying the virtual polyhedron on a capturing page of the capturing apparatus, to perform a photographing guiding based on the virtual polyhedron and obtain photos of the object to be modeled from different capturing viewing angles.

20 Claims, 4 Drawing Sheets

```
Determining a physical position of an object to be modeled according to a physical    ~110
position of a capturing apparatus
                                    |
                                    v
Determining a virtual polyhedron which matches the object to be modeled               ~120
according to the physical position of the object to be modeled
                                    |
                                    v
Based on an augmented reality AR technology, displaying the virtual polyhedron
on a capturing page of the capturing apparatus, to perform a photographing guiding   ~130
based on the virtual polyhedron and obtain photos of the object to be modeled from
different capturing viewing angles
```

(51) Int. Cl.
*G06T 17/05* (2011.01)
*G06T 19/00* (2011.01)
*H04N 23/60* (2023.01)

(56) References Cited

U.S. PATENT DOCUMENTS

2021/0407109 A1* 12/2021 Young .................. G06T 19/006
2023/0100412 A1*  3/2023 Frey ................... G01C 21/3848
                                                              701/445

FOREIGN PATENT DOCUMENTS

| | | |
|---|---|---|
| CN | 112434368 A | 3/2021 |
| CN | 112488783 A | 3/2021 |
| CN | 113178005 A | 7/2021 |
| TW | 202009737 A | 3/2020 |

* cited by examiner

PHOTOGRAPHING GUIDING METHOD AND APPARATUS, AND ELECTRONIC DEVICE AND STORAGE MEDIUM

CROSS-REFERENCE TO RELATED APPLICATION

The present application is a national stage application based on International Patent Application No. PCT/CN2022/114721, filed on Aug. 25, 2022, which claims priority to the Chinese Patent Application No. 202111045908.0, filed on Sep. 7, 2021, and entitled "Photographing Guiding Method and Apparatus, and Electronic Device and Storage Medium", the disclosures of which are incorporated herein by reference in their entireties.

TECHNICAL FIELD

The present disclosure relates to a field of information technology, particularly relates to a photographing guiding method and apparatus, and electronic device and storage medium.

BACKGROUND

Before modeling a target object, it is usually necessary to photograph the target object from different angles to obtain photos of the target object from various viewing angles, and then build a physical model of the target object based on the photos of the target object from various viewing angles. The more viewing angles covered by the photos, the higher the accuracy of the built physical model.

At present, a manual handheld camera is usually used to photograph the target object from different viewing angles, and the viewing angle and the number of the photographed photos are determined according to manual modeling experience.

Obviously, a current photographing method relies too much on the manual modeling experience, which is high labor cost and low efficiency.

SUMMARY

In order to solve the above technical problems, or at least partially solve the above technical problems, embodiments of the present disclosure provide a photographing guiding method and apparatus, and an electronic device and a storage medium, which realize an automatic determination of the photographing angle and the number of photos, which improves the efficiency of photographing, and solve the problem of over-relying on manual modeling experience.

In a first aspect, the embodiments of the present disclosure provide a photographing guiding method, including:
   determining a physical position of an object to be modeled according to a physical position of a capturing apparatus;
   determining a virtual polyhedron which matches the object to be modeled according to the physical position of the object to be modeled;
   based on an augmented reality AR technology, displaying the virtual polyhedron on a capturing page of the capturing apparatus, to perform a photographing guiding based on the virtual polyhedron and obtain photos of the object to be modeled from different capturing viewing angles.
   A face composing the virtual polyhedron represents a capturing viewing angle required to capture for the object to be modeled, and a number of the faces composing the virtual polyhedron represents a number of the photos required to capture for the object to be modeled.

In a second aspect, embodiments of the disclosure further provide a photographing guiding apparatus, including:
   a first determination module, configured to determine a physical position of an object to be modeled according to a physical position of a capturing apparatus;
   a second determination module, configured to determine a virtual polyhedron which matches the object to be modeled according to the physical position of the object to be modeled;
   a guiding module, configured to, based on an augmented reality AR technology, display the virtual polyhedron on a capturing page of the capturing apparatus, to perform a photographing guiding based on the virtual polyhedron and obtain photos of the object to be modeled from different capturing viewing angles.
   A face composing the virtual polyhedron represents the capturing viewing angle required to capture for the object to be modeled, and a number of the faces composing the virtual polyhedron represents a number of photos required to capture for the object to be modeled.

In a third aspect, embodiments of the disclosure further provide an electronic device, including:
   one or more processors;
   a storage device, configured to store one or more programs.
   When the one or more programs are executed by the one or more processors, the one or more processors implement the above photographing guiding methods.

In a fourth aspect, embodiments of the disclosure further provide a computer-readable storage medium, on which a computer program is stored. The above photographing guiding methods are implemented when the program is executed by a processor.

Compared with the prior art, the technical solution provided by the embodiments of the present disclosure has at least the following advantages:

The photographing guiding method provided in the embodiments of the present disclosure comprises, determining a physical position of an object to be modeled according to a physical position of a capturing apparatus; determining a virtual polyhedron which matches the object to be modeled according to the physical position of the object to be modeled; based on an augmented reality AR technology, displaying the virtual polyhedron on a capturing page of the capturing apparatus, to perform a photographing guiding based on the virtual polyhedron and obtain photos of the object to be modeled from different capturing viewing angle, a face composing the virtual polyhedron representing the capturing viewing angle required to capture r the object to be modeled, and a number of the faces composing the virtual polyhedron representing a number of photos required to capture the object to be modeled, which realizes a photographing guiding, to solve a problem of over-relying on manual modeling experience to determine the capturing viewing angle and the number of photos.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

DETAILED DESCRIPTION

Figure 1:
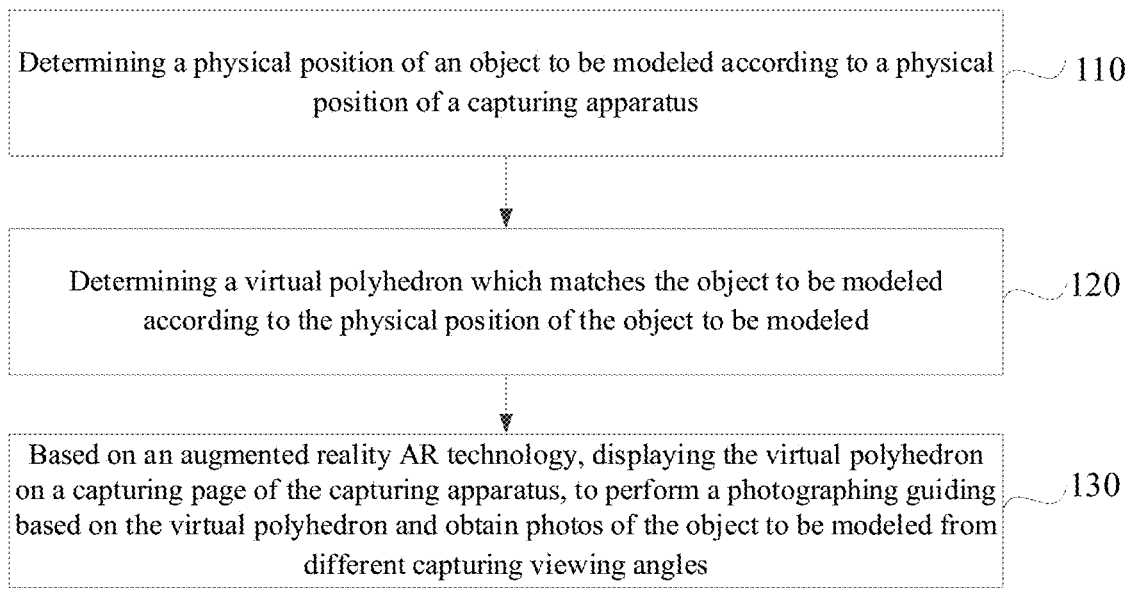
FIG. 1 is a flowchart of a photographing guiding method in an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more."

Names of messages or information exchanged between multiple devices in the embodiments of the present disclosure are used only for illustrative purposes, and are not used to limit a scope of such messages or information.

FIG. 1 is a flowchart of a photographing guiding method in an embodiment of the present disclosure. The method can be performed by a photographing guiding apparatus The apparatus can be implemented by means of software and/or hardware, which can be configured in an electronic device, such as a display terminal, particularly including but not limited to a smart phone, a personal digital assistant, a tablet computer, a portable wearable device, a smart home device (such as a desk lamp), and other electronic devices with a display screen and a capturing apparatus.

As illustrated in FIG. 1, the method can specifically include the following steps:

Step 110: Determining a physical position of an object to be modeled according to a physical position of a capturing apparatus.

The capturing apparatus can refer to a camera, or a handheld terminal equipped with a camera, such as a smart phone. The physical position of the capturing apparatus refers to a real position of the capturing apparatus in physical space, in other words, the physical position of the capturing apparatus refers to a coordinate position of the capturing apparatus in the world coordinate system.

In one embodiment, the determining a physical position of an object to be modeled according to a physical position of a capturing apparatus, includes: in a case where the capturing apparatus is located at a position of the object to be modeled, determining the physical position of the capturing apparatus based on a presetting algorithm; and determining the physical position of the capturing apparatus to be the physical position of the object to be modeled. In a case of photographing the object to be modeled, the object to be modeled is usually placed in a specific position, such that the object to be modeled is in an environment convenient for capturing, for example, a surrounding color is light, to minimize an impact on the capturing. In order to obtain the physical position of the object to be modeled in a case where it is placed in the specific position, the capturing apparatus can first be placed in the specific position, and the physical position of the capturing apparatus can be determined based on a presetting algorithm, and the physical position is the physical position of the object to be modeled in a case where the object to be modeled is placed in the specific position. Taking that the capturing apparatus is a smart phone as an example, a SLAM (Simultaneous Localization and Mapping) algorithm can be run in the smart phone. In a case where the smart phone is placed in the specific position, a physical position of the smart phone can be determined through the SLAM algorithm, and the physical position is the physical position in a case where the object to be modeled is placed in the specific position.

In another embodiment, the determining a physical position of an object to be modeled according to a physical position of a capturing apparatus, includes: capturing the object to be modeled through the capturing apparatus, and obtaining a capturing image of the object to be modeled; determining the physical position of the capturing apparatus based on a presetting algorithm; analyzing the capturing image to determine a relative position relationship between the object to be modeled and the capturing apparatus; and determining the physical position of the object to be modeled according to the physical position of the capturing apparatus and the relative position relationship. That is, the position of the object to be modeled and the position of the capturing apparatus are not limited, the object to be modeled can be placed in any position, and the capturing apparatus can also be in any position, provided that the object to be modeled can be captured at the position of the capturing apparatus, and a relative position between the capturing apparatus and the object to be modeled can be determined according to the captured image, then the physical position of the object to be modeled is determined according to the physical position of the capturing apparatus and the relative position.

Step 120: Determining a virtual polyhedron which matches the object to be modeled according to the physical position of the object to be modeled.

The virtual polyhedron that matches the object to be modeled refers to a polyhedron that can enclose the object to be modeled and can be understood as a covering that can wrap the object to be modeled. The virtual polyhedron comprises a plurality of faces, and each face represents a capturing viewing angle, that is, a part of the object to be modeled can be seen from a specific viewing angle in a case of looking at the object to be modeled from a face of the virtual polyhedron. A total number of the faces included in the virtual polyhedron represents a total number of photos required to be captured. If a shape of the object to be modeled is complex, a matching virtual polyhedron can include more faces to obtain as many capturing images as possible, such that an object model based on the capturing image has a higher accuracy; if the shape of the object to be modeled is simple, the matching virtual polyhedron can include fewer faces. How many faces the virtual polyhedron is required to include can be set by a parameter. If a finer model of the object to be modeled is required to be built, a number of the faces is required to be large, which is usually set by an engineer with more experience in modeling. Once the number of the faces is set, the virtual polyhedron will be automatically generated. With a guidance of the virtual polyhedron, even people with no modeling experience can capturing the object to be modeled, so as to solve the problem of over-relying on manual modeling experience.

Figure 2:
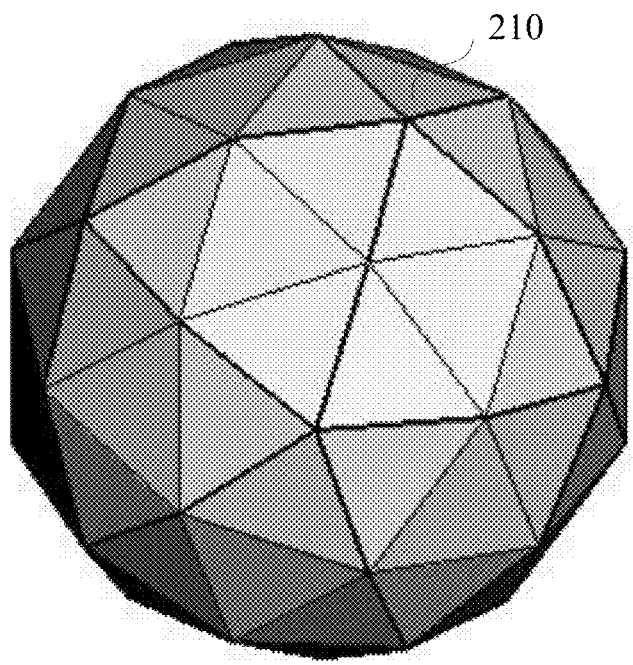
FIG. 2 is a structural schematic diagram of a virtual polyhedron in an embodiment of the present disclosure.

Exemplary, referring to a structural schematic diagram of a virtual polyhedron illustrated in FIG. 2. From FIG. 2, it can be seen that the virtual polyhedron includes many faces 210.

Step 130, Based on an augmented reality AR technology, displaying the virtual polyhedron on a capturing page of the capturing apparatus, to perform a photographing guiding based on the virtual polyhedron and obtain photos of the object to be modeled from different capturing viewing angles.

A face composing the virtual polyhedron represents the capturing viewing angle required to capture the object to be modeled, and a number of the faces composing the virtual polyhedron represents a number of photos required to capture the object to be modeled. The photos of the object to be modeled from different photographing viewing angles are used to construct a three-dimensional model of the object to be modeled. For example, in a case where the object to be modeled is a shoe, photos captured for the shoe from different photographing viewing angles are used to construct a three-dimensional model of the shoe, and the three-dimensional model of the shoe can be used to realize a virtual trying on function of the shoe in a virtual trying on scene. Specifically, in a trying on page, a terminal camera captures a user's feet, and then the three-dimensional model of the shoes is controlled to be tried on to wear on the user's feet, which presents a virtual trying on effect. Further, the three-dimensional model of the shoe can be stored in a form of a file package on a server, and in a case where a client needs to use the three-dimensional model of the shoe, the corresponding three-dimensional model is acquired from the server.

Specifically, taking that the capturing apparatus is a smart phone as an example, from the user angle, although the user holds the phone by a hand and aligns the camera with the object to be modeled, a capturing page of the phone that the user sees does not display the object to be modeled, but the virtual polyhedron. In a case where the user moves the phone and changes the position that the camera aligns with, it can be seen that a color of the face corresponding to the virtual polyhedron displayed on the capturing page changes. For example, at the beginning, many faces of the virtual polyhedron are red, and only a target face currently aligned by the camera is green, if the user triggers a capturing control member at this time, that is, to capture a photo, the target face currently aligned by the camera remains green, and even if the user moves the phone to align the camera with other faces of the virtual polyhedron, the color of the target face remains green, which indicates that the user has completed capturing a photo. In the case where the user does not trigger the capturing control member when the camera is aligned with the target face, when the user moves the phone so that the camera is no longer aligned with the target face, but is aligned with other faces, the target face returns to red, which indicates that the capturing has not been completed for the target face, and the other faces aligned with the camera temporarily turn green. Only if the user captures the face aligned with the camera, the face will always remain green.

By performing a photographing guiding for the user on the plurality of faces of the virtual polyhedron, the user does not need to choose the capturing viewing angle by himself/herself, but only needs to align the plurality of faces of the virtual polyhedron to capture; by controlling the color of each face of the virtual polyhedron, it is convenient for the user to remember which viewing angles of photos have been captured and which viewing angles of photos have not been captured, and it is very convenient to guide the user to quickly complete the capturing, which facilitates improving a capturing efficiency.

Specifically, in one embodiment, the based on an augmented reality AR technology, displaying the virtual polyhedron on a capturing page of the capturing apparatus, to perform a photographing guiding based on the virtual polyhedron and obtain photos of the object to be modeled from different capturing viewing angles, includes: preforming a first prompting to prompt a user to align a capturing focus of the capturing apparatus with a target face composing the virtual polyhedron, wherein the target face is one of the plurality of faces of the virtual polyhedron, a manner of preforming the first prompting can be voice broadcasting, displaying prompting text or displaying prompting gesture. In response to a capturing operation for the target face through the capturing apparatus, controlling a color of the target face to change so as to prompt the user to align the capturing focus of the capturing apparatus with other faces composing the virtual polyhedron, the other faces refer to any face other than the target face, and the capturing for the target face has been completed, so the user can be guided to continue capturing other faces. The face composing the virtual polyhedron represents the capturing viewing angle required to capture for the object to be modeled, and a number of the faces composing the virtual polyhedron represents a number of photos required to capture for the object to be modeled.

Further, in one embodiment, a capturing distance can further be prompted, that is, if the user is far from the object to be modeled, the user is prompted to approach the object to be modeled, and if the user is close to the object to be modeled, the user is prompted to stay away from the object to be modeled. Specifically, the based on an augmented reality AR technology, displaying the virtual polyhedron on a capturing page of the capturing apparatus, to perform a photographing guiding based on the virtual polyhedron and obtain photos of the object to be modeled from different capturing viewing angles, includes: in a case where the virtual polyhedron is beyond the capturing page, that is, the capturing page cannot display a complete virtual polyhedron, performing a second prompting to prompt the user to move the capturing apparatus close to the object to be captured; in a case where an area of the capturing page occupied by the virtual polyhedron is less than a setting value, performing a third prompting to prompt the user to move the capturing apparatus away from the object to be captured. A manner of the second prompting and the third prompting can be voice broadcasting or displaying prompting text.

The photographing guiding method provided by the embodiments of the present disclosure determines the physical position of the object to be modeled according to the position of the capturing apparatus, and then determines the virtual polyhedron that can be covered above the object to be modeled according to the physical position of the object to be modeled, displays the determined virtual polyhedron on the capturing page, and performs the photographing guiding for the user through the plurality of faces of the virtual polyhedron, so that the user does not need to choose the capturing viewing angle by himself/herself, but only needs to align the plurality of faces of the virtual polyhedron to capture; by controlling the color of each face of the virtual polyhedron, it is convenient for users to remember which viewing angles of photos have been captured and which viewing angles of photos have not been captured, and it is very convenient to guide the user to quickly complete the capturing, which facilitates improving a capturing efficiency.

Figure 3:
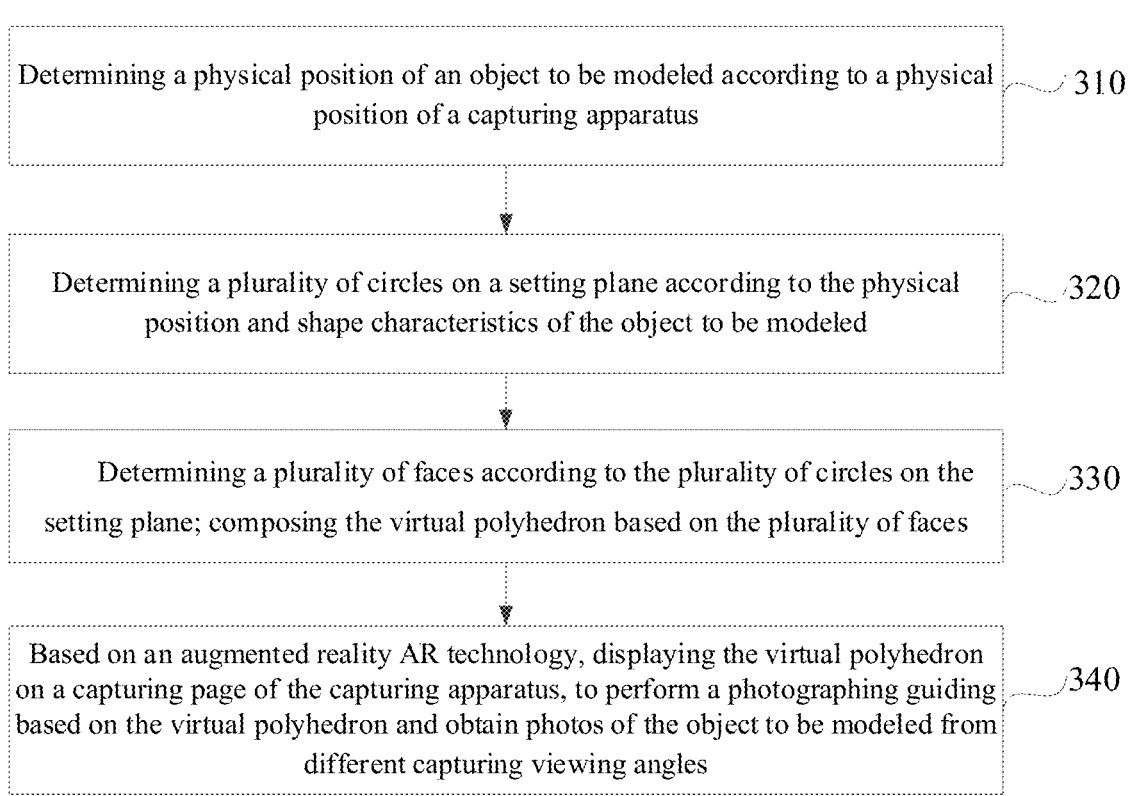
FIG. 3 is a flowchart of a photographing guiding method in an embodiment of the present disclosure.

FIG. 3 is a flowchart of a photographing guiding method in an implementation method. Based on the above embodiments, the present embodiments provide specific embodiments for the above step 120 "Determining a virtual polyhedron which matches the object to be modeled according to the physical position of the object to be modeled."

As illustrated in FIG. 3, the photographing guiding method includes the following steps:

Step 310. Determining the physical position of the object to be modeled according to the physical position of the capturing apparatus.

Step 320: Determining a plurality of circles on a setting plane according to the physical position and shape characteristics of the object to be modeled.

The setting plane can be a horizontal plane or a vertical plane perpendicular to the horizontal plane, or a plane with a certain angle to the horizontal plane.

Taking that the setting plane is a horizontal plane as an example, the determining a plurality of circles on a setting plane according to the physical position and shape characteristics of the object to be modeled, includes: determining a first circle in a horizontal plane by using the physical position of the object to be modeled as a first circle center, and a first presetting value as a first radius; obtaining a second circle center by moving the first circle center in an opposite direction (i.e. a vertical direction) of the gravity direction by a presetting distance; determining a second circle in a horizontal plane by using the second circle center as a circle center, and a second presetting value as a second radius; similarly, continuing to move the first circle center in the opposite direction of the gravity direction to obtain a third circle center, a fourth circle center, etc., and correspondingly, determining a third circle in a horizontal plane by using a third presetting value as a third radius, and determining a fourth circle in a horizontal plane by using a fourth presetting value as a fourth radius, etc., until the first circle center reaches a setting position. The plurality of circles includes the first circle and the second circle, and the first presetting value, the presetting distance, the second presetting value and the setting position are determined according to the shape characteristics of the object to be modeled. It should be understood that if a bottom portion of the object to be modeled is wider than a top portion, for example a cone, the second radius of the second circle above is smaller than the first radius of the first circle; if the bottom portion of the object to be modeled is narrower than the top portion, for example an inverted cone, the second radius of the second circle above is greater than the first radius of the first circle.

A total number of the circles in the horizontal plane that composes the virtual polyhedron is determined according to the shape of the object to be modeled, because the virtual polyhedron that is finally constructed needs to be able to enclose the object to be modeled. Thus, the virtual polyhedron is wider than the widest position of the object to be modeled and higher than the highest position of the object to be modeled.

Step 330, Determining a plurality of faces according to the plurality of circles on the setting plane and composing the virtual polyhedron based on the plurality of faces.

Figure 4:
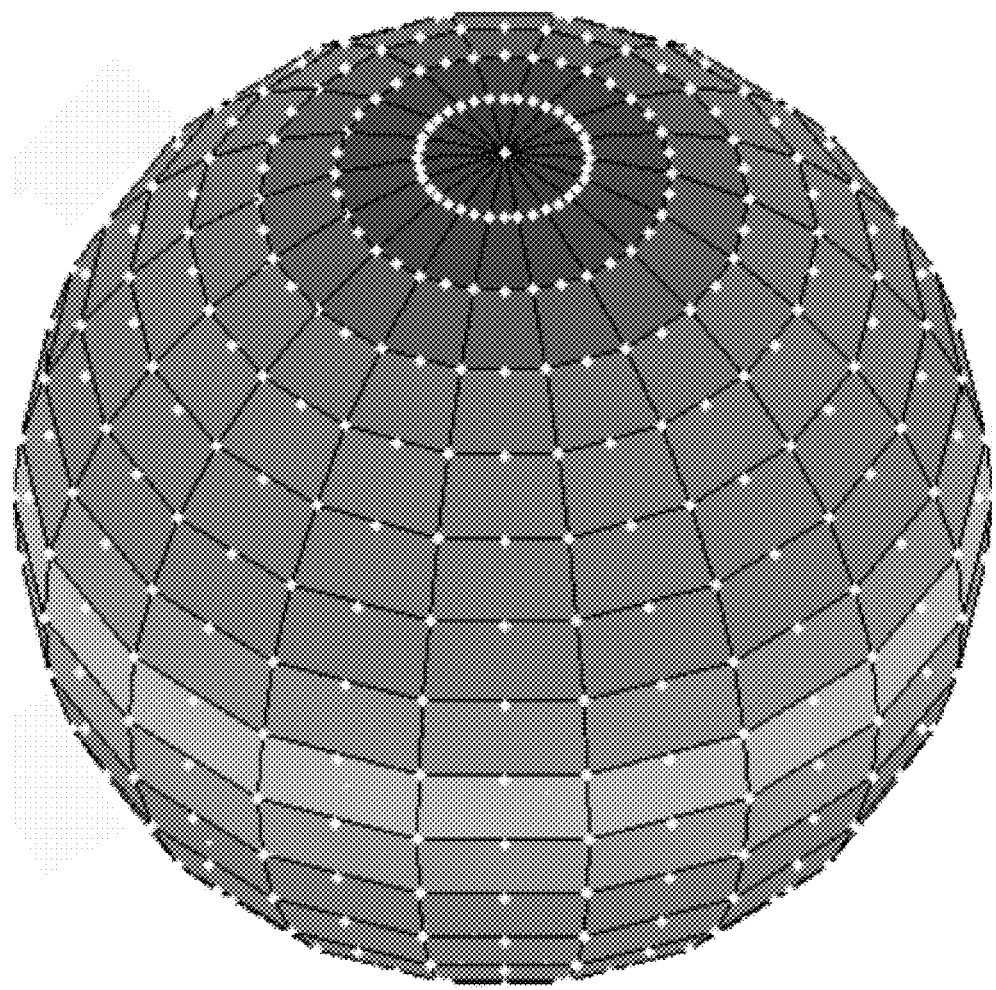
FIG. 4 is a structural schematic diagram of a virtual polyhedron in an embodiment of the present disclosure.

In one embodiment, the determining a plurality of faces according to the plurality of circles on the setting plane, includes: determining a presetting number of points on a first circular arc of the first circle; determining the presetting number of points on a second circular arc of the second circle; connecting the points on the first circular arc with the points on the second circular arc one by one to form the plurality of faces. The presetting number is determined according to the shape characteristics of the object to be modeled. Connecting the points on the first circular arc with the points on the second circular arc one by one refers to one point on the first circular arc can only be connected with one point on the second circular arc, and one point on the second circular arc can only be connected with one point on the first circular arc. Referring to a structural diagram of a virtual polyhedron illustrated in FIG. 4, which includes a plurality of circles on the horizontal plane, and the circular arc of each of the plurality of circles includes a plurality of points, the points on two adjacent circular arcs are connected one by one correspondingly to form the plurality of faces.

Step 340, Based on an augmented reality AR technology, displaying the virtual polyhedron on a capturing page of the capturing apparatus, to perform a photographing guiding based on the virtual polyhedron and obtain photos of the object to be modeled from different capturing viewing angles.

A face composing the virtual polyhedron represents the capturing viewing angle required to capture for the object to be modeled, and a number of the faces composing the virtual polyhedron represents a number of photos required to capture for the object to be modeled.

Figure 5:
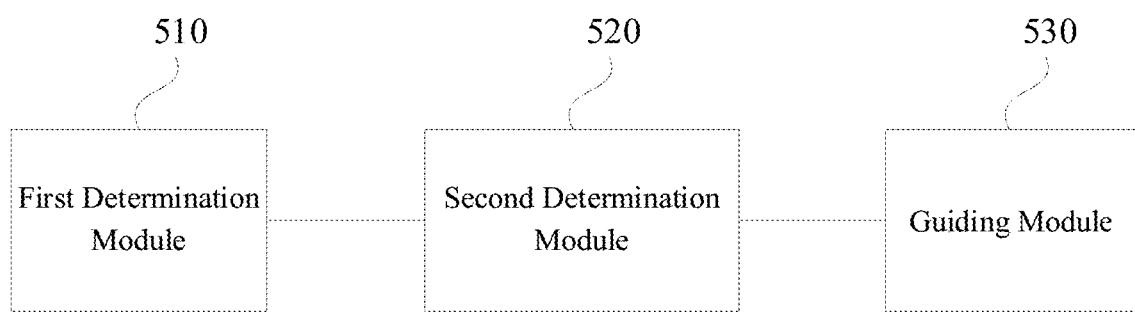
FIG. 5 is a structural schematic diagram of a photographing guiding apparatus in an embodiment of the present disclosure.

FIG. 5 is a structural schematic diagram of a photographing guiding apparatus in an embodiment of the present disclosure. As illustrated in FIG. 5, the photographing guiding apparatus specifically includes: a first determination module 510, a second determination module 520 and a guiding module 530.

The first determination module 510 is configured to determine a physical position of an object to be modeled according to a physical position of a capturing apparatus; the second determination module 520 is configured to determine a virtual polyhedron which matches the object to be modeled according to the physical position of the object to be modeled; the guiding module 530 is configured to display the virtual polyhedron on a capturing page of the capturing apparatus, to perform a photographing guiding based on the virtual polyhedron and obtain photos of the object to be modeled from different capturing viewing angles based on an augmented reality AR technology. A face composing the virtual polyhedron represents the capturing viewing angle required to capture for the object to be modeled, and a number of the faces composing the virtual polyhedron represents a number of photos required to capture for the object to be modeled.

Optionally, the first determination module 510 includes: a first determination unit, configured to determine the physical position of the capturing apparatus based on a presetting algorithm in a case where the capturing apparatus is located at a position of the object to be modeled; a second determination unit, configured to determine the physical position of the capturing apparatus as the physical position of the object to be modeled.

Optionally, the first determination module 510 includes: a capturing unit, configured to capture the object to be modeled through the capturing apparatus, and obtain a capturing image of the object to be modeled; an analysis unit, configured to perform an image analyzing on the capturing image, and determine a relative position relationship between the object to be modeled and the capturing apparatus; a third determination unit, configured to determine the physical position of the object to be modeled according to the physical position of the capturing apparatus and the relative position relationship.

Optionally, the second determination module 520 includes: a fourth determination unit, configured to determine a plurality of circles on a setting plane according to the physical position and shape characteristics of the object to be modeled; a fifth determination unit, configured to determine a plurality of faces according to the plurality of circles on the setting plane, and compose the virtual polyhedron based on the plurality of faces.

Optionally, the fourth determination unit includes: a first determination sub-unit, configured to determine a first circle in a horizontal plane by using the physical position of the object to be modeled as a first circle center, and a first presetting value as a first radius; a first moving sub-unit, configured to obtain a second circle center by moving the first circle center in an opposite direction of the gravity direction by a presetting distance; a second determining sub-unit, configured to determine a second circle in a horizontal plane by using the second circle center as a circle center, and a second presetting value as a second radius. The plurality of circles comprises the first circle and the second circle, and the first presetting value, the presetting distance and the second presetting value are determined according to the shape characteristics of the object to be modeled.

Optionally, the fifth determination unit includes: a third determination sub-unit, configured to determine a presetting number of points on a first circular arc of the first circle, and determine the presetting number of points on a second circular arc of the second circle; a connecting sub-unit, configured to connect the points on the first circular arc with the points on the second circular arc one by one to form the plurality of faces. The presetting number is determined according to the shape characteristics of the object to be modeled.

Optionally, the guiding module 530 includes: a first prompting unit, configured to perform a first prompting to prompt a user to align a capturing focus of the capturing apparatus with a target face composing the virtual polyhedron; a controlling unit, configured to in response to a capturing operation for the target face through the capturing apparatus, control a color of the target face to change so as to prompt the user to align the capturing focus of the capturing apparatus with other faces composing the virtual polyhedron. A face composing the virtual polyhedron represents the capturing viewing angle required to capture for the object to be modeled, and a number of the faces composing the virtual polyhedron represents a number of photos required to capture for the object to be modeled.

Optionally, the guiding module 530 includes: a second prompting unit, configured to perform a second prompting to prompt a user to move the capturing apparatus close to an object to be captured in a case where the virtual polyhedron is beyond the capturing page; a third prompting unit, configured to perform a third prompt to prompt the user to move the capturing apparatus away from the object to be captured in a case where an area of the capturing page occupied by the virtual polyhedron is less than a setting value.

The photographing guiding apparatus provided by the embodiments of the present disclosure determines the physical position of the object to be modeled according to the position of the capturing apparatus, and then determines the virtual polyhedron that can be covered above the object to be modeled according to the physical position of the object to be modeled, displays the virtual polyhedron determined on the capturing page, and performs photographing guiding for the user through the plurality of faces of the virtual polyhedron, so that the user does not need to choose the capturing viewing angle by himself/herself, but only needs to align the plurality of faces of the virtual polyhedron to photograph; by controlling the color of each face of the virtual polyhedron, it is convenient for the user to remember which viewing angles of photos have been captured and which viewing angles of photos have not been captured, and it is very convenient to guide the user to quickly complete the capturing, which facilitates improving a photographing efficiency.

The photographing guiding apparatus provided by the embodiments of the present disclosure can perform the steps in the photographing guiding method provided by the embodiments of the present disclosure, and execution steps and beneficial effects are not described here.

Figure 6:
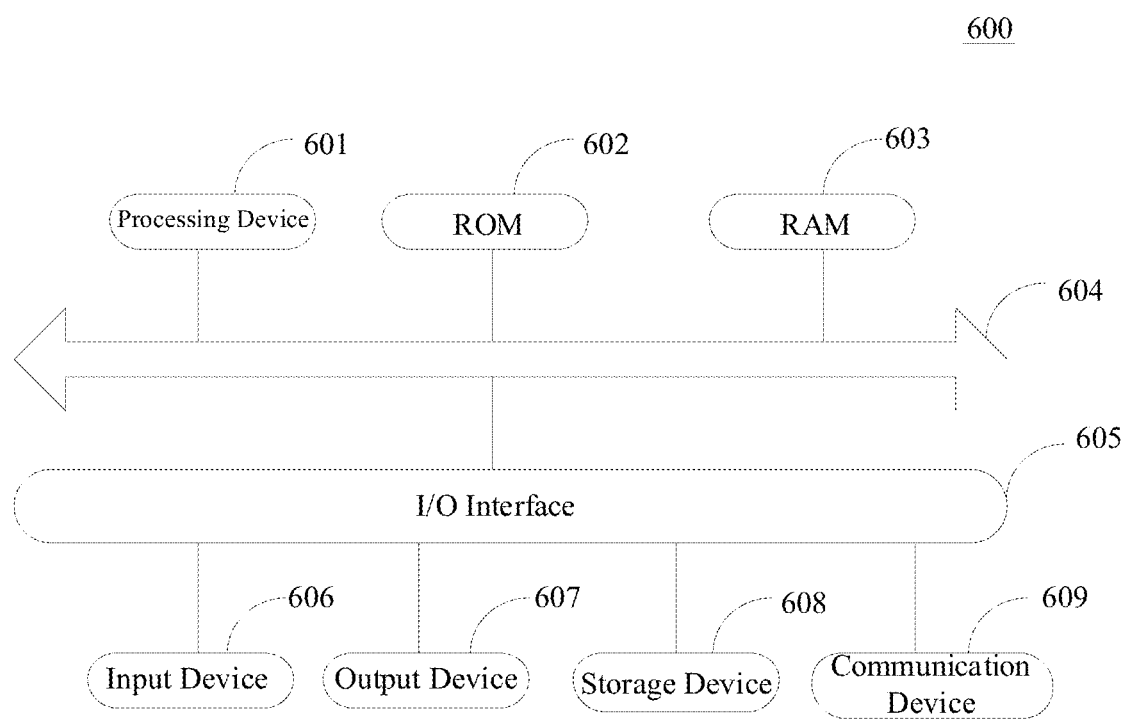
FIG. 6 is a structural schematic diagram of an electronic device in an embodiment of the present disclosure.

FIG. 6 is a structural schematic diagram of an electronic device in an embodiment of the present disclosure. Referring specifically to FIG. 6, which illustrates a structural schematic diagram suitable for a realization of an electronic device 600 in the embodiments of the present disclosure. The electronic device 600 in the embodiments of the present disclosure can include, but is not limited to, a mobile terminal such as a mobile phone, a laptop computer, a digital broadcast receiver, a PDA (personal digital assistant), a pad (tablet computer), a PMP (portable multimedia player), an in-vehicle terminal (for example, in-vehicle navigation terminal), a wearable electronic device, etc., and a fixed terminal such as a digital TV, a desktop computer, and a smart home device, etc. The electronic device illustrated in FIG. 6 is only an example and should not impose any limitations on functionality and a usage scope of the embodiments of the present disclosure.

As illustrated in FIG. 6, the electronic device 600 can include a processing device 601 (for example, a central processing unit, a graphic processing unit, etc.), it can perform various appropriate actions and processes based on programs stored in a read-only memory (ROM) 602 or loaded from a storage device 608 into a random access memory (RAM) 603 to implement the method described in the embodiments of the present disclosure. In the RAM 603, various programs and data required for an operation of the electronic device 600 are further stored. The processing unit 601, the ROM 602, and the RAM 603 are connected to each other by a bus 604. An input/output (I/O) interface 605 is further connected to the bus 604.

In general, the following devices can be connected to the I/O interface 605: an input device 606, including, for example, a touch screen, a touchpad, a keyboard, a mouse, a camera, a microphone, an accelerometer, a gyroscope, etc.; an output device 607, including, for example, a liquid crystal display (LCD), a loudspeaker, a vibrator, etc.; a storage device 608, including, for example, a magnetic tape, a hard disk, etc.; and a communication device 609. The communication device 609 can allow the electronic device 600 to perform wireless or wired communication with other devices to exchange data. Although FIG. 6 illustrates an electronic device 600 with various apparatuses, it should be understood that it is not required to implement or have all of the apparatuses illustrated, which can be implemented alternatively or the electronic device 600 have more or fewer apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram to implement the above methods. In such an embodiment, the computer program may be downloaded and installed from the network by the communication apparatus 609, or installed from the storage apparatus 608, or installed from ROM 602. When the computer program is executed by the processing apparatus 601, the above functions defined in the methods in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above computer-readable medium can be included in the above electronic device. It can also exist separately without being assembled into the electronic device.

The above computer-readable medium carries one or more programs, which, when executed by the electronic device, cause the electronic device to:

determine a physical position of an object to be modeled according to a physical position of a capturing apparatus; determine a virtual polyhedron which matches the object to be modeled according to the physical position of the object to be modeled; based on an augmented reality AR technology, displaying the virtual polyhedron on a capturing page of the capturing apparatus, to perform a photographing guiding based on the virtual polyhedron and obtain photos of the object to be modeled from different capturing viewing angles. A face composing the virtual polyhedron represents the capturing viewing angle required to capture for the object to be modeled, and a number of the faces composing the virtual polyhedron represents a number of the photos required to capture for the object to be modeled.

Optionally, when one or more of the above programs are executed by the electronic device, the electronic device can also perform other steps as described in the above embodiments.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the disclosure, the disclosure provides a photographing guiding method, including: determining a physical position of an object to be modeled according to a physical position of a capturing apparatus; determining a virtual polyhedron which matches the object to be modeled according to the physical position of the object to be modeled; based on an augmented reality AR technology, displaying the virtual polyhedron on a capturing page of the capturing apparatus, to perform a photographing guiding based on the virtual polyhedron and obtain photos of the object to be modeled from different capturing viewing angles. A face composing the virtual polyhedron represents the capturing viewing angle required to capture for the object to be modeled, and a number of the faces composing the virtual polyhedron represents a number of the photos required to capture for the object to be modeled.

According to one or more embodiments of the disclosure, in the photographing guiding method provided by the disclosure, optionally, the determining a physical position of an object to be modeled according to a physical position of a capturing apparatus, includes: in a case where the capturing apparatus is located at a position of the object to be modeled, determining the physical position of the capturing apparatus based on a presetting algorithm; determining the physical position of the capturing apparatus as the physical position of the object to be modeled.

According to one or more embodiments of the disclosure, in the photographing guiding method provided by the disclosure, optionally, the determining a physical position of an object to be modeled according to a physical position of a capturing apparatus, includes: photographing the object to be modeled through the capturing apparatus, and obtaining a capturing image of the object to be modeled; determining the physical position of the capturing apparatus based on a presetting algorithm; performing an image analyzing on the capturing image, and determining a relative position relationship between the object to be modeled and the capturing apparatus; determining the physical position of the object to be modeled according to the physical position of the capturing apparatus and the relative position relationship.

According to one or more embodiments of the disclosure, in the photographing guiding method provided by the disclosure, optionally, the determining a virtual polyhedron which matches the object to be modeled according to the physical position of the object to be modeled, includes: determining a plurality of circles on a setting plane according to the physical position and shape characteristics of the object to be modeled; determining a plurality of faces according to the plurality of circles on the setting plane; composing the virtual polyhedron based on the plurality of faces.

According to one or more embodiments of the disclosure, in the photographing guiding method provided by the disclosure, optionally, the determining a plurality of circles on a setting plane according to the physical position and shape characteristics of the object to be modeled, includes: determining a first circle in a horizontal plane by using the physical position of the object to be modeled as a first circle center, and a first presetting value as a first radius; obtaining a second circle center by moving the first circle center in an opposite direction of a gravity direction by a presetting distance; determining a second circle in a horizontal plane by using the second circle center as a circle center, and a second presetting value as a second radius. The plurality of circles comprises the first circle and the second circle, and the first presetting value, the presetting distance and the second presetting value are determined according to the shape characteristics of the object to be modeled.

According to one or more embodiments of the disclosure, in the photographing guiding method provided by the disclosure, optionally, the determining a plurality of faces according to the plurality of circles on the setting plane, includes: determining a presetting number of points on a first circular arc of the first circle; determining the presetting number of points on a second circular arc of the second circle; connecting the points on the first circular arc with the points on the second circular arc one by one to form the plurality of faces. The presetting number is determined according to the shape characteristics of the object to be modeled.

According to one or more embodiments of the disclosure, in the photographing guiding method provided by the disclosure, optionally, the based on an augmented reality AR technology, displaying the virtual polyhedron on a capturing page of the capturing apparatus, to perform a photographing guiding based on the virtual polyhedron and obtain photos of the object to be modeled from different capturing viewing angles, includes: preforming a first prompting to prompt a user to align a capturing focus of the capturing apparatus with a target face composing the virtual polyhedron; in response to a photographing operation for the target face through the capturing apparatus, controlling a color of the target face to change so as to prompt the user to align the capturing focus of the capturing apparatus with other faces composing the virtual polyhedron. A face composing the virtual polyhedron represents the capturing viewing angle required to capture for the object to be modeled, and a number of the faces composing the virtual polyhedron represents a number of the photos required to capture for the object to be modeled According to one or more embodiments of the disclosure, in the photographing guiding method provided by the disclosure, optionally, the based on an augmented reality AR technology, displaying the virtual polyhedron on a capturing page of the capturing apparatus, to perform a photographing guiding based on the virtual polyhedron and obtain photos of the object to be modeled from different capturing viewing angles, includes: in a case where the virtual polyhedron is beyond the capturing page, performing a second prompting to prompt a user to move the capturing apparatus close to an object to be captured; in a case where an area of the capturing page occupied by the virtual polyhedron is less than a setting value, performing a third prompting to prompt the user to move the capturing apparatus away from the object to be captured.

According to one or more embodiments of the disclosure, the disclosure provides a photographing guiding apparatus, including: a first determination module, configured to determine a physical position of an object to be modeled according to a physical position of a capturing apparatus; a second determination module, configured to determine a virtual polyhedron which matches the object to be modeled according to the physical position of the object to be modeled; a guiding module, configured to, based on an augmented reality AR technology, display the virtual polyhedron on a capturing page of the capturing apparatus, to perform a photographing guiding based on the virtual polyhedron and obtain photos of the object to be modeled from different capturing viewing angles. A face composing the virtual polyhedron represents the capturing viewing angle required to capture for the object to be modeled, and a number of the faces composing the virtual polyhedron represents a number of photos required to capture for the object to be modeled.

According to one or more embodiments of the disclosure, in the photographing guiding apparatus provided by the disclosure, optionally, the first determination module includes: a first determination unit, configured to determine the physical position of the capturing apparatus based on a presetting algorithm in a case where the capturing apparatus is located at a position of the object to be modeled; a second determination unit, configured to determine the physical position of the capturing apparatus as the physical position of the object to be modeled.

According to one or more embodiments of the disclosure, in the photographing guiding apparatus provided by the disclosure, optionally, the first determination module includes: a capturing unit, configured to capture the object to be modeled through the capturing apparatus, and obtain a capturing image of the object to be modeled; an analysis unit, configured to perform an image analyzing on the capturing image, and determining a relative position relationship between the object to be modeled and the capturing apparatus; a third determination unit, configured to determine the physical position of the object to be modeled according to the physical position of the capturing apparatus and the relative position relationship.

According to one or more embodiments of the disclosure, in the photographing guiding apparatus provided by the disclosure, optionally, the second determination module includes: a fourth determination unit, configured to determine a plurality of circles on a setting plane according to the physical position and shape characteristics of the object to be modeled; a fifth determination unit, configured to determine a plurality of faces according to the plurality of circles on the setting plane, and compose the virtual polyhedron based on the plurality of faces.

According to one or more embodiments of the disclosure, in the photographing guiding apparatus provided by the disclosure, optionally, the fourth determination unit includes: a first determination sub-unit, configured to determine a first circle in a horizontal plane by using the physical position of the object to be modeled as a first circle center, and a first presetting value as a first radius; a first moving sub-unit, configured to obtain a second circle center by moving the first circle center in an opposite direction of the gravity direction by a presetting distance; a second determining sub-unit, configured to determine a second circle in a horizontal plane by using the second circle center as a circle center, and a second presetting value as a second radius. The plurality of circles comprises the first circle and the second circle, and the first presetting value, the presetting distance and the second presetting value are determined according to the shape characteristics of the object to be modeled.

According to one or more embodiments of the disclosure, in the photographing guiding apparatus provided by the disclosure, optionally, the fifth determination unit includes: a third determination sub-unit, configured to determine a presetting number of points on a first circular arc of the first circle, and determine the presetting number of points on a second circular arc of the second circle; a connecting sub-unit, configured to connect the points on the first circular arc with the points on the second circular arc one by one to form the plurality of faces. The presetting number is determined according to the shape characteristics of the object to be modeled.

According to one or more embodiments of the disclosure, in the photographing guiding apparatus provided by the disclosure, optionally, the guiding module includes: a first prompting unit, configured to perform a first prompting to prompt a user to align a capturing focus of the capturing apparatus with a target face composing the virtual polyhedron; a controlling unit, configured to in response to a capturing operation for the target face through the capturing apparatus, control a color of the target face to change so as to prompt the user to align the capturing focus of the capturing apparatus with other faces composing the virtual polyhedron. A face composing the virtual polyhedron represents the capturing viewing angle required to capture for the object to be modeled, and a number of the faces composing the virtual polyhedron represents a number of photos required to capture for the object to be modeled.

According to one or more embodiments of the disclosure, in the photographing guiding apparatus provided by the disclosure, optionally, the guiding module includes: a second prompting unit, configured to perform a second prompting to prompt a user to move the capturing apparatus close to an object to be captured in a case where the virtual polyhedron is beyond the capturing page; a third prompting unit, configured to perform a third prompt to prompt the user to move the capturing apparatus away from the object to be captured in a case where an area of the capturing page occupied by the virtual polyhedron is less than a setting value.

According to one or more embodiments, the disclosure provides an electronic device, including:
one or more processors;
a storage device, configured to store one or more programs.

When the one or more programs are executed by the one or more processors, the one or more processors implement any one of photographing guiding methods provided in the disclosure.

According to one or more embodiments, the disclosure provides a computer-readable storage medium, on which a computer program is stored. Any one of the photographing guiding methods provided by the disclosure is implemented when the program is executed by a processor.

The disclosure further provides a computer program product including a computer program or instructions. Any one of the photographing guiding methods provided by the disclosure is implemented when the program or the instructions is executed by a processor.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A photographing guiding method, wherein the method comprises:
    determining a physical position of an object to be modeled according to a physical position of a capturing apparatus;
    determining a virtual polyhedron which matches the object to be modeled according to the physical position of the object to be modeled;
    based on an augmented reality AR technology, displaying the virtual polyhedron on a capturing page of the capturing apparatus, to perform a photographing guiding based on the virtual polyhedron and obtain photos of the object to be modeled from different capturing viewing angles,
    wherein a face composing the virtual polyhedron represents the capturing viewing angle required to capture for the object to be modeled, and a number of the faces composing the virtual polyhedron represents a number of the photos required to capture for the object to be modeled.

2. The method according to claim 1, wherein the determining a physical position of an object to be modeled according to a physical position of a capturing apparatus, comprises:
    in a case where the capturing apparatus is located at a position of the object to be modeled, determining the physical position of the capturing apparatus based on a presetting algorithm;
    determining the physical position of the capturing apparatus as the physical position of the object to be modeled.

3. The method according to claim 2, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
    preforming a first prompting to prompt a user to align a capturing focus of the capturing apparatus with a target face composing the virtual polyhedron;
    in response to a photographing operation for the target face through the capturing apparatus, controlling a color of the target face to change so as to prompt the user to align the capturing focus of the capturing apparatus with other faces composing the virtual polyhedron.

4. The method according to claim 2, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
    in a case where the virtual polyhedron is beyond the capturing page, performing a second prompting to prompt a user to move the capturing apparatus close to an object to be captured;
    in a case where an area of the capturing page occupied by the virtual polyhedron is less than a setting value, performing a third prompting to prompt the user to move the capturing apparatus away from the object to be captured.

5. The method according to claim 1, wherein the determining a physical position of an object to be modeled according to a physical position of a capturing apparatus, comprises:
    photographing the object to be modeled through the capturing apparatus, and obtaining a capturing image of the object to be modeled;
    determining the physical position of the capturing apparatus based on a presetting algorithm;
    performing an image analyzing on the capturing image, and determining a relative position relationship between the object to be modeled and the capturing apparatus;

determining the physical position of the object to be modeled according to the physical position of the capturing apparatus and the relative position relationship.

6. The method according to claim 5, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
preforming a first prompting to prompt a user to align a capturing focus of the capturing apparatus with a target face composing the virtual polyhedron;
in response to a photographing operation for the target face through the capturing apparatus, controlling a color of the target face to change so as to prompt the user to align the capturing focus of the capturing apparatus with other faces composing the virtual polyhedron.

7. The method according to claim 5, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
in a case where the virtual polyhedron is beyond the capturing page, performing a second prompting to prompt a user to move the capturing apparatus close to an object to be captured;
in a case where an area of the capturing page occupied by the virtual polyhedron is less than a setting value, performing a third prompting to prompt the user to move the capturing apparatus away from the object to be captured.

8. The method according to claim 1, wherein the determining a virtual polyhedron which matches the object to be modeled according to the physical position of the object to be modeled, comprises:
determining a plurality of circles on a setting plane according to the physical position and shape characteristics of the object to be modeled;
determining a plurality of faces according to the plurality of circles on the setting plane;
composing the virtual polyhedron based on the plurality of faces.

9. The method according to claim 8, wherein the determining a plurality of circles on a setting plane according to the physical position and shape characteristics of the object to be modeled, comprises:
determining a first circle in a horizontal plane by using the physical position of the object to be modeled as a first circle center, and a first presetting value as a first radius;
obtaining a second circle center by moving the first circle center in an opposite direction of a gravity direction by a presetting distance;
determining a second circle in a horizontal plane by using the second circle center as a circle center, and a second presetting value as a second radius;
wherein the plurality of circles comprises the first circle and the second circle, and the first presetting value, the presetting distance and the second presetting value are determined according to the shape characteristics of the object to be modeled.

10. The method according to claim 9, wherein the determining a plurality of faces according to the plurality of circles on the setting plane, comprises:

determining a presetting number of points on a first circular arc of the first circle;
determining the presetting number of points on a second circular arc of the second circle;
connecting the points on the first circular arc with the points on the second circular arc one by one to form the plurality of faces;
wherein the presetting number is determined according to the shape characteristics of the object to be modeled.

11. The method according to claim 10, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
preforming a first prompting to prompt a user to align a capturing focus of the capturing apparatus with a target face composing the virtual polyhedron;
in response to a photographing operation for the target face through the capturing apparatus, controlling a color of the target face to change so as to prompt the user to align the capturing focus of the capturing apparatus with other faces composing the virtual polyhedron.

12. The method according to claim 9, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
in a case where the virtual polyhedron is beyond the capturing page, performing a second prompting to prompt a user to move the capturing apparatus close to an object to be captured;
in a case where an area of the capturing page occupied by the virtual polyhedron is less than a setting value, performing a third prompting to prompt the user to move the capturing apparatus away from the object to be captured.

13. The method according to claim 9, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
preforming a first prompting to prompt a user to align a capturing focus of the capturing apparatus with a target face composing the virtual polyhedron;
in response to a photographing operation for the target face through the capturing apparatus, controlling a color of the target face to change so as to prompt the user to align the capturing focus of the capturing apparatus with other faces composing the virtual polyhedron.

14. The method according to claim 8, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
preforming a first prompting to prompt a user to align a capturing focus of the capturing apparatus with a target face composing the virtual polyhedron;

in response to a photographing operation for the target face through the capturing apparatus, controlling a color of the target face to change so as to prompt the user to align the capturing focus of the capturing apparatus with other faces composing the virtual polyhedron.

15. The method according to claim 1, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
preforming a first prompting to prompt a user to align a capturing focus of the capturing apparatus with a target face composing the virtual polyhedron;
in response to a photographing operation for the target face through the capturing apparatus, controlling a color of the target face to change so as to prompt the user to align the capturing focus of the capturing apparatus with other faces composing the virtual polyhedron.

16. The method according to claim 8, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
in a case where the virtual polyhedron is beyond the capturing page, performing a second prompting to prompt a user to move the capturing apparatus close to an object to be captured;
in a case where an area of the capturing page occupied by the virtual polyhedron is less than a setting value, performing a third prompting to prompt the user to move the capturing apparatus away from the object to be captured.

17. The method according to claim 1, wherein the based on an augmented reality AR technology, displaying the virtual polyhedron on a capturing page of the capturing apparatus, to perform a photographing guiding based on the virtual polyhedron and obtain photos of the object to be modeled from different capturing viewing angles, comprises:
in a case where the virtual polyhedron is beyond the capturing page, performing a second prompting to prompt a user to move the capturing apparatus close to an object to be captured;
in a case where an area of the capturing page occupied by the virtual polyhedron is less than a setting value, performing a third prompting to prompt the user to move the capturing apparatus away from the object to be captured.

18. A photographing guiding apparatus, wherein the photographing guiding apparatus comprises:
a first determination module, configured to determine a physical position of an object to be modeled according to a physical position of a capturing apparatus;
a second determination module, configured to determine a virtual polyhedron which matches the object to be modeled according to the physical position of the object to be modeled;
a guiding module, configured to, based on an augmented reality AR technology, display the virtual polyhedron on a capturing page of the capturing apparatus, to perform a photographing guiding based on the virtual polyhedron and obtain photos of the object to be modeled from different capturing viewing angles,
wherein a face composing the virtual polyhedron represents the capturing viewing angle required to capture for the object to be modeled, and a number of the faces composing the virtual polyhedron represents a number of photos required to capture for the object to be modeled.

19. An electronic device, wherein the electronic device comprises:
one or more processors;
a storage device, configured to store one or more programs;
wherein when the one or more programs are executed by the one or more processors, the one or more processors implement a photographing guiding method, and the method comprises:
determining a physical position of an object to be modeled according to a physical position of a capturing apparatus;
determining a virtual polyhedron which matches the object to be modeled according to the physical position of the object to be modeled;
based on an augmented reality AR technology, displaying the virtual polyhedron on a capturing page of the capturing apparatus, to perform a photographing guiding based on the virtual polyhedron and obtain photos of the object to be modeled from different capturing viewing angles,
wherein a face composing the virtual polyhedron represents the capturing viewing angle required to capture for the object to be modeled, and a number of the faces composing the virtual polyhedron represents a number of the photos required to capture for the object to be modeled.

20. A non-transitory computer-readable storage medium, on which a computer program is stored, wherein the method according to claim 1 is implemented when the program is executed by a processor.

\* \* \* \* \*